April 26, 1949.  J. MUELLER ET AL  2,468,341
PAPER FEED MECHANISM FOR ACCOUNTING MACHINES
Filed Feb. 17, 1944  13 Sheets-Sheet 1
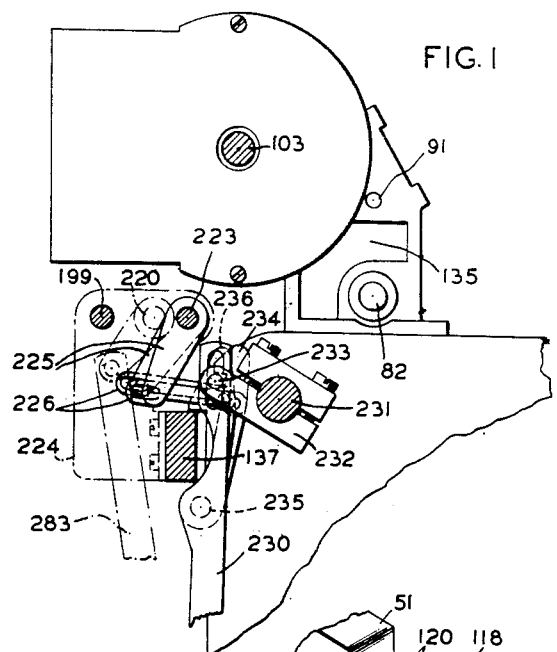
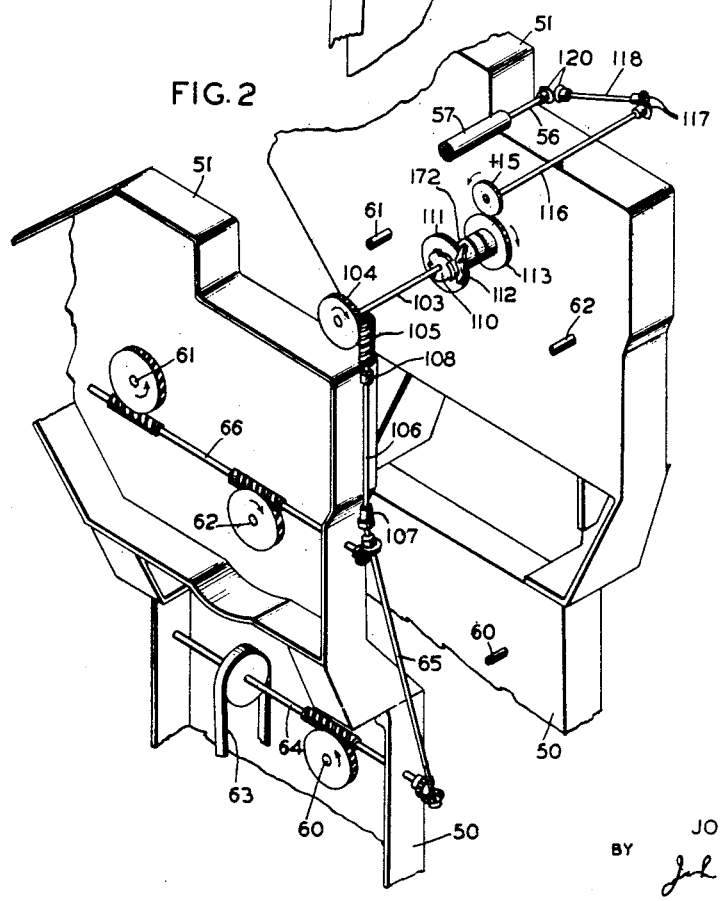
INVENTORS
JOHN MUELLER AND
JOSEPH M. McDONNELL
BY
ATTORNEY April 26, 1949.  J. MUELLER ET AL  2,468,341
PAPER FEED MECHANISM FOR ACCOUNTING MACHINES
Filed Feb. 17, 1944  13 Sheets-Sheet 2

INVENTORS
JOHN MUELLER &
JOSEPH M. McDONNELL
BY
ATTORNEY

April 26, 1949.     J. MUELLER ET AL     2,468,341
PAPER FEED MECHANISM FOR ACCOUNTING MACHINES
Filed Feb. 17, 1944.                     13 Sheets-Sheet 3
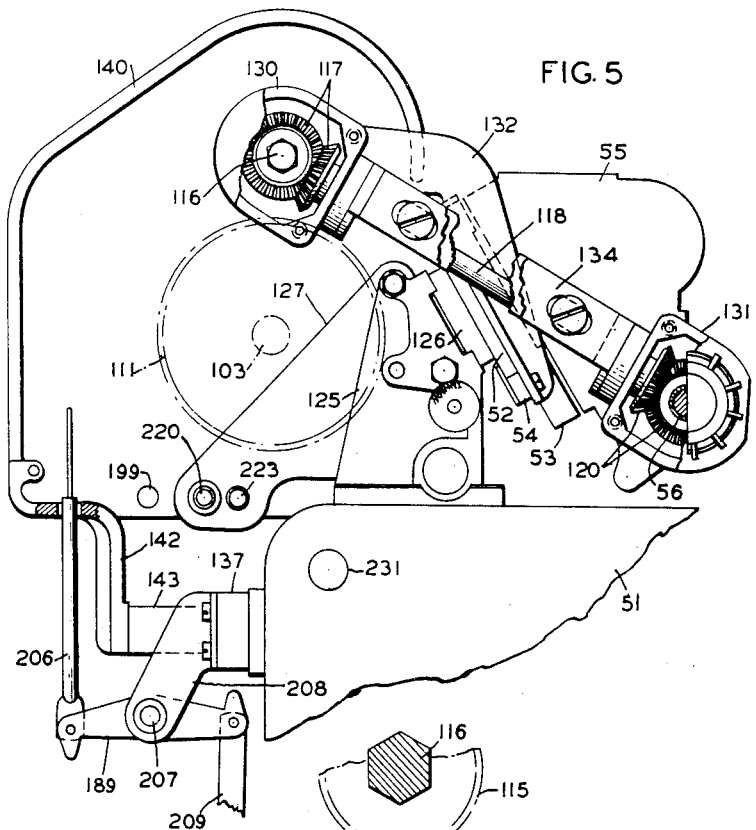
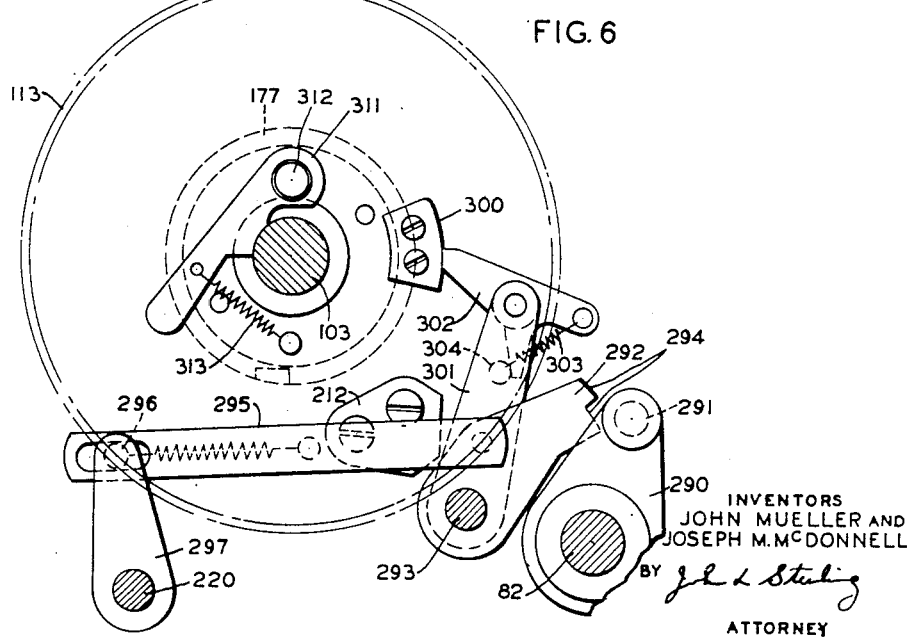
INVENTORS
JOHN MUELLER AND
JOSEPH M. McDONNELL
BY
ATTORNEY April 26, 1949.　　　J. MUELLER ET AL　　　2,468,341
PAPER FEED MECHANISM FOR ACCOUNTING MACHINES
Filed Feb. 17, 1944　　　　　　　　　　　　　　　13 Sheets-Sheet 4

INVENTORS
JOHN MUELLER AND
JOSEPH M. McDONNELL
BY
ATTORNEY

April 26, 1949. J. MUELLER ET AL 2,468,341
PAPER FEED MECHANISM FOR ACCOUNTING MACHINES
Filed Feb. 17, 1944 13 Sheets-Sheet 6
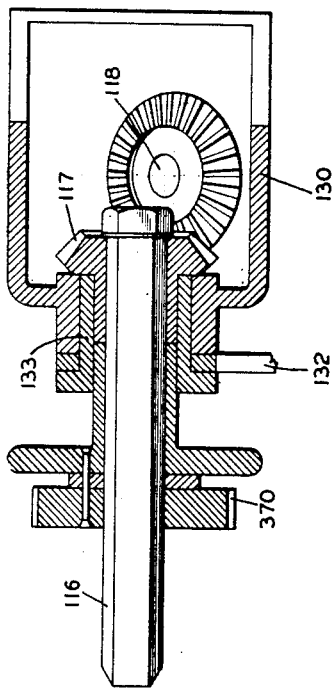
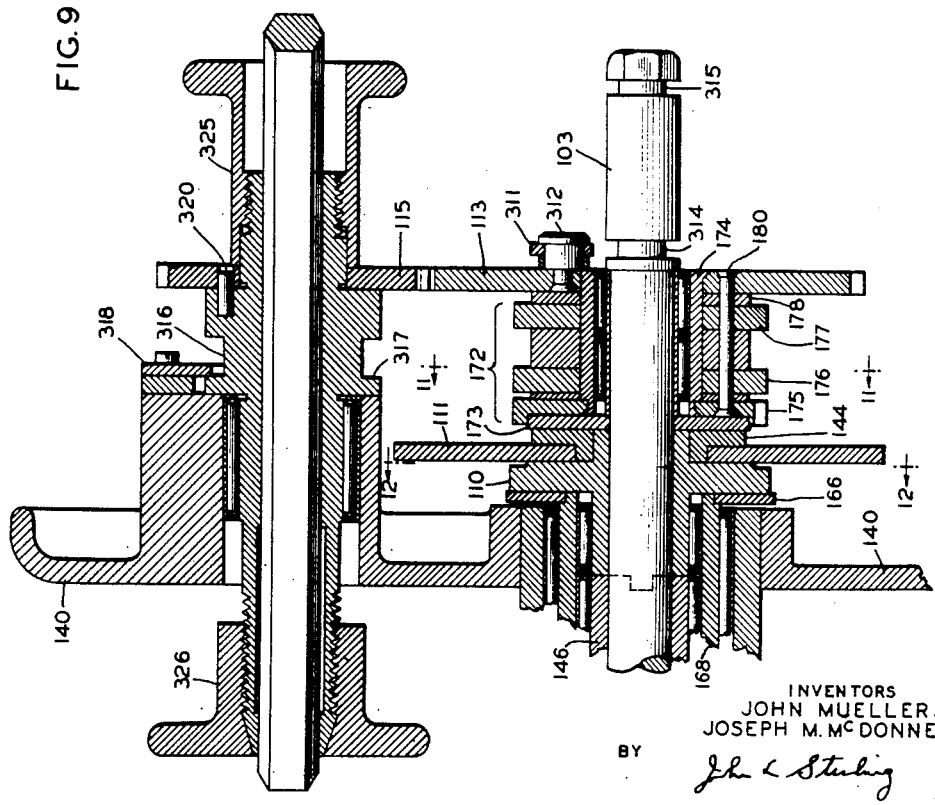
FIG. 9
INVENTORS
JOHN MUELLER AND
JOSEPH M. McDONNELL
BY John L. Sterling
ATTORNEY April 26, 1949. J. MUELLER ET AL 2,468,341
PAPER FEED MECHANISM FOR ACCOUNTING MACHINES
Filed Feb. 17, 1944. 13 Sheets-Sheet 7

INVENTORS
JOHN MUELLER AND
JOSEPH M. McDONNELL
BY
ATTORNEY

INVENTORS
JOHN MUELLER AND
JOSEPH M. MCDONNELL
BY John L. Sterling
ATTORNEY

April 26, 1949.　　　　J. MUELLER ET AL　　　　2,468,341
PAPER FEED MECHANISM FOR ACCOUNTING MACHINES
Filed Feb. 17, 1944　　　　　　　　　　　　　　　13 Sheets-Sheet 9

INVENTORS
JOHN MUELLER AND
JOSEPH M. McDONNELL
BY
ATTORNEY

April 26, 1949.  J. MUELLER ET AL  2,468,341
PAPER FEED MECHANISM FOR ACCOUNTING MACHINES
Filed Feb. 17, 1944  13 Sheets-Sheet 10

INVENTORS
JOHN MUELLER AND
JOSEPH M. McDONNELL
BY
ATTORNEY

April 26, 1949.　　　　J. MUELLER ET AL　　　　2,468,341
PAPER FEED MECHANISM FOR ACCOUNTING MACHINES
Filed Feb. 17, 1944　　　　　　　　　　　　13 Sheets-Sheet 12

INVENTORS
JOHN MUELLER AND
JOSEPH M. McDONNELL
BY
ATTORNEY

April 26, 1949.    J. MUELLER ET AL    2,468,341
PAPER FEED MECHANISM FOR ACCOUNTING MACHINES
Filed Feb. 17, 1944    13 Sheets-Sheet 13
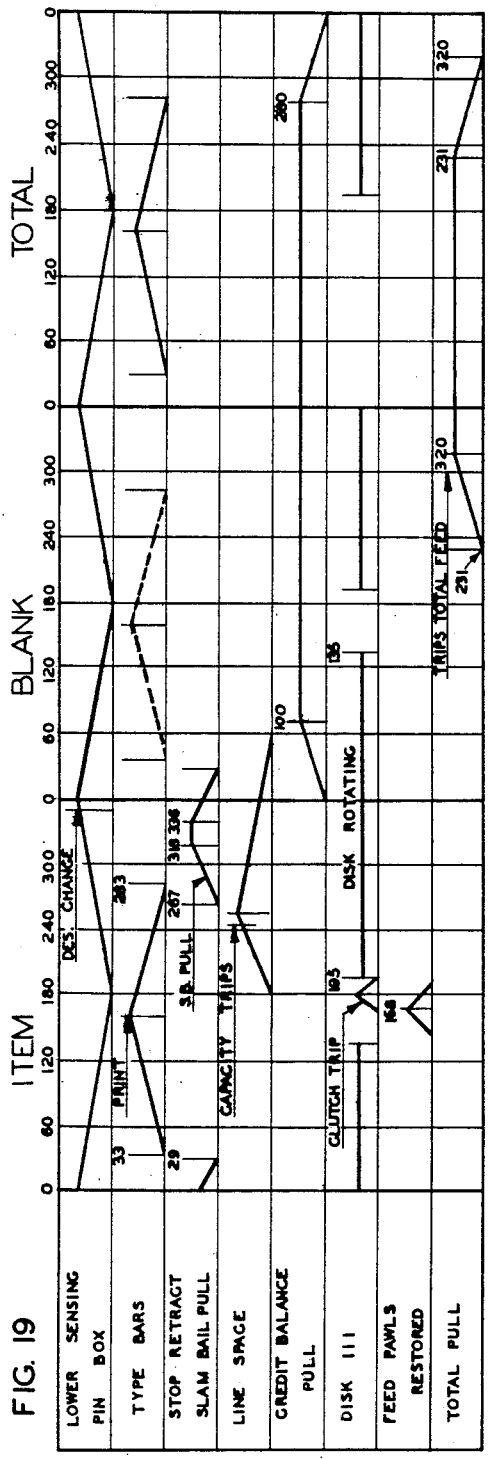
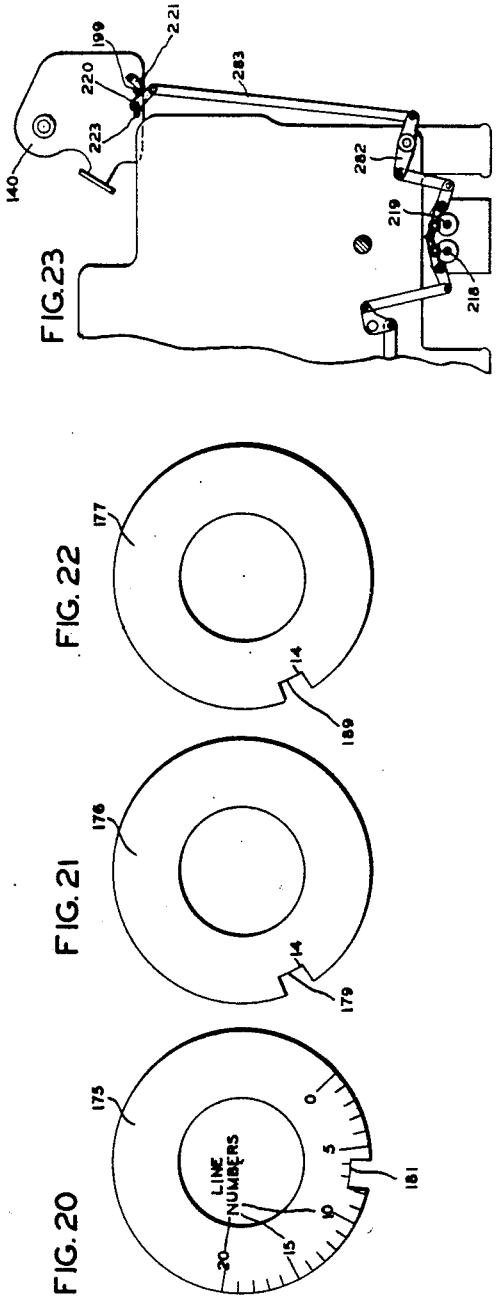
INVENTORS
JOHN MUELLER AND
JOSEPH M. McDONNELL
BY Robert H. Strother
ATTORNEY Patented Apr. 26, 1949

2,468,341

UNITED STATES PATENT OFFICE 2,468,341

PAPER-FEED MECHANISM FOR ACCOUNTING MACHINES

John Mueller, North Bergen, N. J., and Joseph Martin McDonnell, Baldwin, N. Y., assignors to Remington Rand Inc., Buffalo, N. Y., a corporation of Delaware Application February 17, 1944, Serial No. 522,720

6 Claims. (Cl. 235—61.9)

The invention relates to the paper feed mechanism of accounting and like machines, and more especially to the "long feed" mechanism for imparting occasional feeds to the paper to greater extents than the ordinary line spacing.

One object of the invention is to improve the means whereby the paper feed is geared to the platen, so as to enable a larger portion of a machine cycle to be utilized for paper feeding and so as to provide better and sturdier gearing for the purpose, and generally to provide a better mechanical construction and operation. Where long feeds have been operated by the power drive of the machine, they have usually involved some sort of reciprocating rack or other part, the return motion of which has consumed a portion of the cycle; and to feed the paper to any considerable distance by these devices has presented mechanical difficulties.

According to the present invention, the long feed of the paper is effected from the power drive through a train of unidirectional gearing controlled by differential devices and a clutch, so that, when advancing the paper, the platen shaft is simply geared to the machine motor like any other shaft.

It is an object of the invention to provide improved means to control the said clutch and the cooperating parts to time their operation in relation to one another and to the other mechanism of the machine.

One object of the invention is to provide control devices to initiate a long-feed of the paper automatically under desired conditions, which controls are so designed that they may readily be adapted to the different requirements of different installations.

Where long feed mechanisms are used to feed a web of paper divided into forms, it sometimes happens that the number of items in a group exceeds the capacity of a form and means have heretofore been provided to feed the paper automatically to the first item line of the next form; and, where totals are taken at the ends of the groups, some special provisions have been made to meet the case where a total taking operation is indicated at the very bottom of a form, resulting sometimes in a total being printed alone on the second form. It is one of the objects of the present invention to prevent the total from appearing alone on a sheet. Means are provided whereby in all instances, at least one item is printed on the same form as the total.

Another object of the invention is to provide improved means for controlling line spacing.

Means are provided whereby, under certain circumstances, a particular line space operation may be prevented altogether. Means are also provided to afford different extents of line-to-line feed. For example, the several lines of the heading of an invoice may be single spaced and the item lines double-spaced.

Another object is to provide improved means whereby the paper carriage of the machine may be displaced laterally, notwithstanding that the platen mounted in said carriage is geared to the machine motor.

Means are provided whereby, under certain conditions, the long feed mechanism may cause the machine to execute a "blank" cycle, that is to say, a cycle in which most of the ordinary functions of the machine such as printing, adding, etc., are suspended. In the instance of the invention chosen for illustration herein, this is used to await an automatic determination by the machine as to whether or not a total is to be taken at the time, but it may also be used for other purposes.

Other objects of the invention will be apparent in the course of the following description.

To the above ends, the invention consists in certain features of construction and combinations and arrangements of parts, all of which will be fully described herein and particularly pointed out in the claims.

In the drawings, except where otherwise stated, the side views are taken as viewed from the left of the operator as he faces the front of the machine, and the plan views are as viewed from the rear.

Fig. 1 is a fragmentary elevation in front-to-rear section on the line 1—1 of Fig. 7, and showing certain parts in operated positions;

Fig. 2 is an isometric schematic view showing the power drive mechanism of the long paper feed;

Fig. 5 is an elevation of the rear left portion of the machine, but with many parts omitted;

Fig. 6 is a view of the means for controlling line space feed from the long feed mechanism, parts being shown in section on the line 6—6 of Fig. 8. In this figure the gearing is shown proportioned to afford a feed twice as great as in the other figures;

Fig. 9 is a longitudinal section through the centers of the two principal shafts, with parts broken and parts omitted. This is on a larger scale than the preceding;

Fig. 19 is a time chart;

Figures 3, 4:
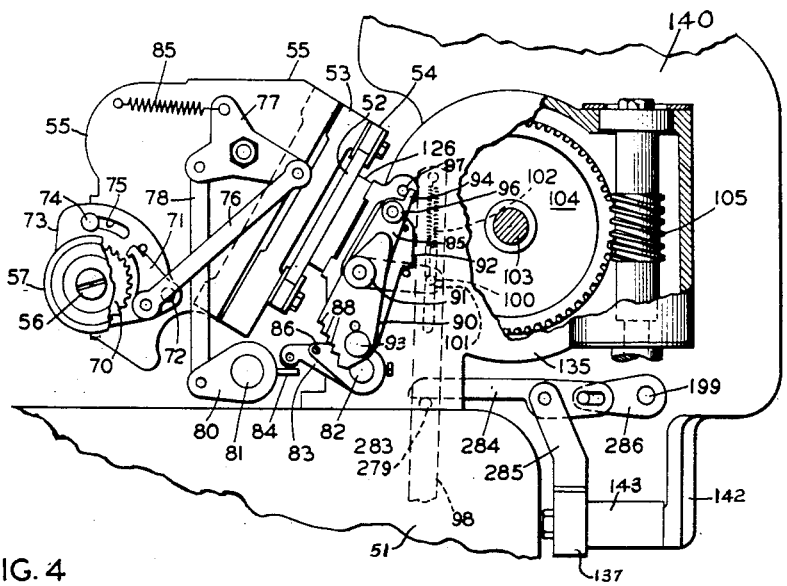
Fig. 3 is a right hand end view of the carriage of the tabulating machine and showing in section a portion of the power drive mechanism of the present invention.
Fig. 4 shows one form of a web of forms adapted to be handled by the invention.

Figs. 20, 21, and 22 are face views of line finding disks; and

Fig. 23 is a diagram of a certain linkage.

In the drawings the invention is shown applied to the Powers No. 3 record controlled tabulating machine described in the patent to John Mueller, No. 2,381,361, dated August 7, 1945. For the purposes of the present invention, the machine is, with some minor exceptions, the same as that disclosed in the patent to Lasker and Mueller, No. 2,323,816, dated July 6, 1943. Said Powers tabulating machine comprises a base section having side frames 50 (Fig. 2) surmounted by a head section having side frames 51. Punched cards are fed through the base section where they are sensed, and the adding and printing are effected by mechanism in the head section. The paper carriage is supported by brackets 135 (Fig. 1) and 125 (Fig. 5), one rising from each of the frames 51, said brackets supporting a stationary rail consisting of a flat bar 52. The main carriage bar 53 has what amounts to grooved rails 54 embracing the bar 52 on which they can be slid right and left if the work so requires, the carriage being then locked in position, as by a set screw (not shown). By means not shown, the main carriage bar 53 supports an auxiliary carriage structure comprising a longitudinal bar and end brackets 55 in which latter is journaled the shaft 56 of the paper platen 57 which stands behind the type bars 58, and which, in the illustrated instance, is used as a paper feeding cylinder.

For the long feed, the platen shaft is rotated by unidirectional gearing from a motor, without the intervention of a reciprocating element; and preferably, it is geared to the regular motor that operates the machine as a whole. In the application of the invention to the Powers machine, it was found desirable to locate much of the mechanism behind the paper carriage. As shown schematically in Fig. 2, the main base shaft 60, the front head shaft 61 and rear head shaft 62 are driven at equal speeds by a belt 63, base worm shaft 64, upright shaft 65 and head worm shaft 66. One rotation of the shafts 60, 61 and 62, measures a cycle of the machine operation.

The line space mechanism of the Powers machine is at the right hand end of the carriage and comprises (Fig. 3) a line space ratchet 70, operated by a pawl 71 pivoted at 72 to a plate 73 pivoted on the platen shaft and limited in its oscillation by a stud 74 in a slot 75. Said pawl is operated by a link 76, lever 77, link 78 and an arm 80 on a rock shaft 81 journaled in the main carriage 53. A rock shaft 82 journaled in the stationary framework, has an arm 83 which presses on the upper surface of a flange 84 projecting from the rock shaft 81 and normally holds the parts in the positions shown in Fig. 3, against the tension of a spring 85. On line spacing, the shaft 82 is permitted to be rocked clockwise by the spring 85 until a pin 86 on an arm 87, fast on said shaft, is arrested by one of the steps 88 of a settable stop plate 90. This causes the plate 73 and pawl 71 to advance a distance equal to three, two, or 1 tooth space of ratchet 70, or not at all, depending on the setting of stop plate 90. A cam then forces shaft 82 to rock counterclockwise. The first part of the return motion causes pawl 71 to engage a tooth of the ratchet, and further movement rotates the platen three, two, one or no teeth.

The stop plate 90 is pivoted on a rock shaft 91 having a plate 92 fixed thereon and having in it four holes into any one of which a plunger lock 93 may be inserted when setting plate 90 relative to plate 92 and shaft 91. A third plate 95 is pivoted on the shaft 91 and may be set relative to plate 92 and secured in set position by a plunger 96 of the former entering holes in the latter plate. Plate 95 has a finger 94 shown in engagement with a fixed stop 97, but said plate may be set one or more spaces away from said stop, whereupon it becomes possible, by rocking the shaft 91, to swing stop plate 90 counterclockwise one or more spaces and thus to afford line spacing to an extent greater than that to which the plate 90 was set; and said shaft is so rocked on total taking cycles, to space totals farther than item line spacing. In the drawing, the parts are set, as required for the form shown in Fig. 4, for double line space of items and the same (no additional space) for totals. The rocking of shaft 91 is effected preliminary to a total cycle, by an upward motion of a link 98, having a slot in which engages a pin 100 on an arm 101 projecting from the shaft, a spring 102 tending to hold the pin in the top of the slot. When the link moves upward, it will rock the shaft as far as the plate 95 and stop 97 will permit, the balance of the motion of the link stretching the spring. Said link 98 is operated by the "total cams" and a "grand total cam" (not shown) on the shafts 218, 219 (Fig. 16) of the total taking control unit of the machine. It moves upward in the latter part of the blank cycle, remains up until after printing on the total cycle, and is then restored. It corresponds to the link 857 of the Patent 2,323,816 (see Figs. 52, 55, 57, and 59 of that patent). This link 98 is utilized in the present instance as a convenient element to initiate a long paper feed following a total, as will appear hereinafter.

*Long feed drive*

The main paper feed drive shaft 103 (Fig. 2)

lies behind the described carriage mounting, and it has a worm wheel 104 driven by a worm 105 and upright shaft 106 which is in effect, an extension of the shaft 65. As the shaft 106 is not in exact alinement with shaft 65 nor with worm 105, it is connected with shaft 65 by a universal joint 107 and with the worm 105 by a universal joint 108. The shaft 103 and a clutch disk 110 fast thereon, rotate continuously when the machine is in operation. Loose on said shaft are a drive disk 111 and an assembly comprising certain notched pick up or line disks 172 and, rigid therewith, a gear wheel 113. The disk 111 is rotated by a one-revolution clutch comprising a clutch pawl 112 pivoted to said disk, and the clutch disk 110, adapted to be engaged by said pawl. Certain devices carried by the drive disk 111, impart measured partial rotations to the drum 172 and gear 113, and the latter meshes with a gear 115 on a counter shaft 116 which, at the left hand end of the carriage, drives, by miter gears 117 a fore-and-aft shaft 118 which is geared to the platen shaft 56 by miter gears 120. It will be perceived that when the long paper feed is in operation, the platen shaft is simply geared to the motor like any other shaft, instead of being operated by a reciprocating device.

The paper feed shaft 103 is geared to rotate at a higher angular speed than the main shafts 60, 61 and 62, so that a complete rotation of disk 111 is effected in less than a complete machine cycle, and there is a portion of the cycle when the mechanism driven by said disk is standing still. The parts are so timed that this quiescent interval covers the moment at which printing is effected. In the illustrated instance, the worm wheels on shafts 60, 61 and 62, have sixty teeth each, and the wheel 104 on the shaft 103, has fifty teeth, so that the gearing is in the ratio of six to five. Therefore the paper feed is effected in 300° of a machine cycle, which affords time for a feed of considerable length without excessive speed.

It will be perceived that the unit comprising the gear 113 and disks 172 is geared to the platen so that a rotation of said unit rotates the platen and so that any rotation of the platen, as by the line space feed, also rotates said unit.

Framing

Figure 8:
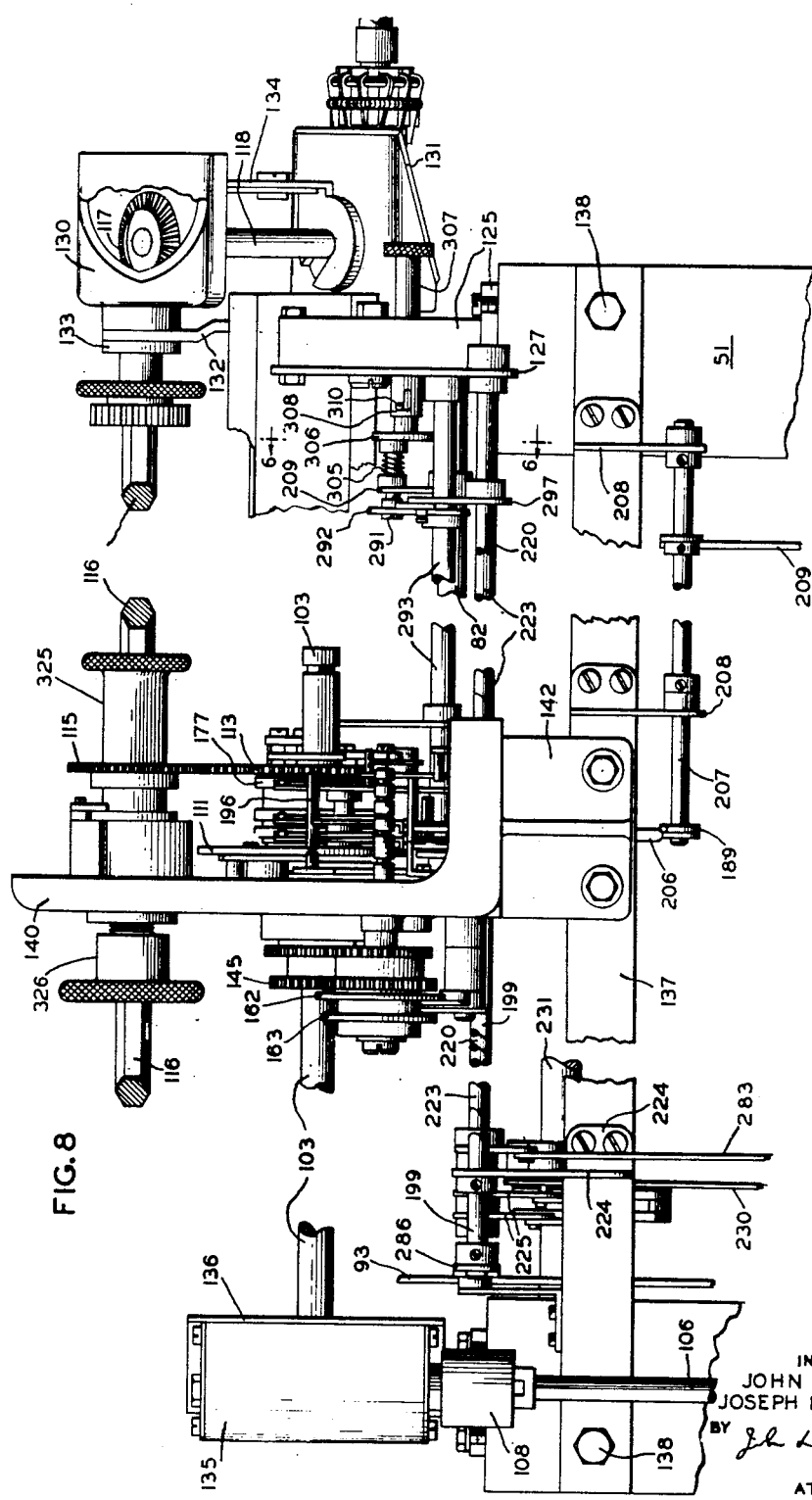
Fig. 8 is a rear elevation of the main portions of the feed mechanism, with parts broken and parts omitted.

The left hand carriage supporting bracket 125 (Figs. 5 and 8) is but little changed from that usually found in the Powers machine. The stationary carriage bar or rail 52 is secured to it by a screw and a spacing block 126. It has secured to it a plate bracket 127 to support certain parts to be described hereinafter.

Figure 7:
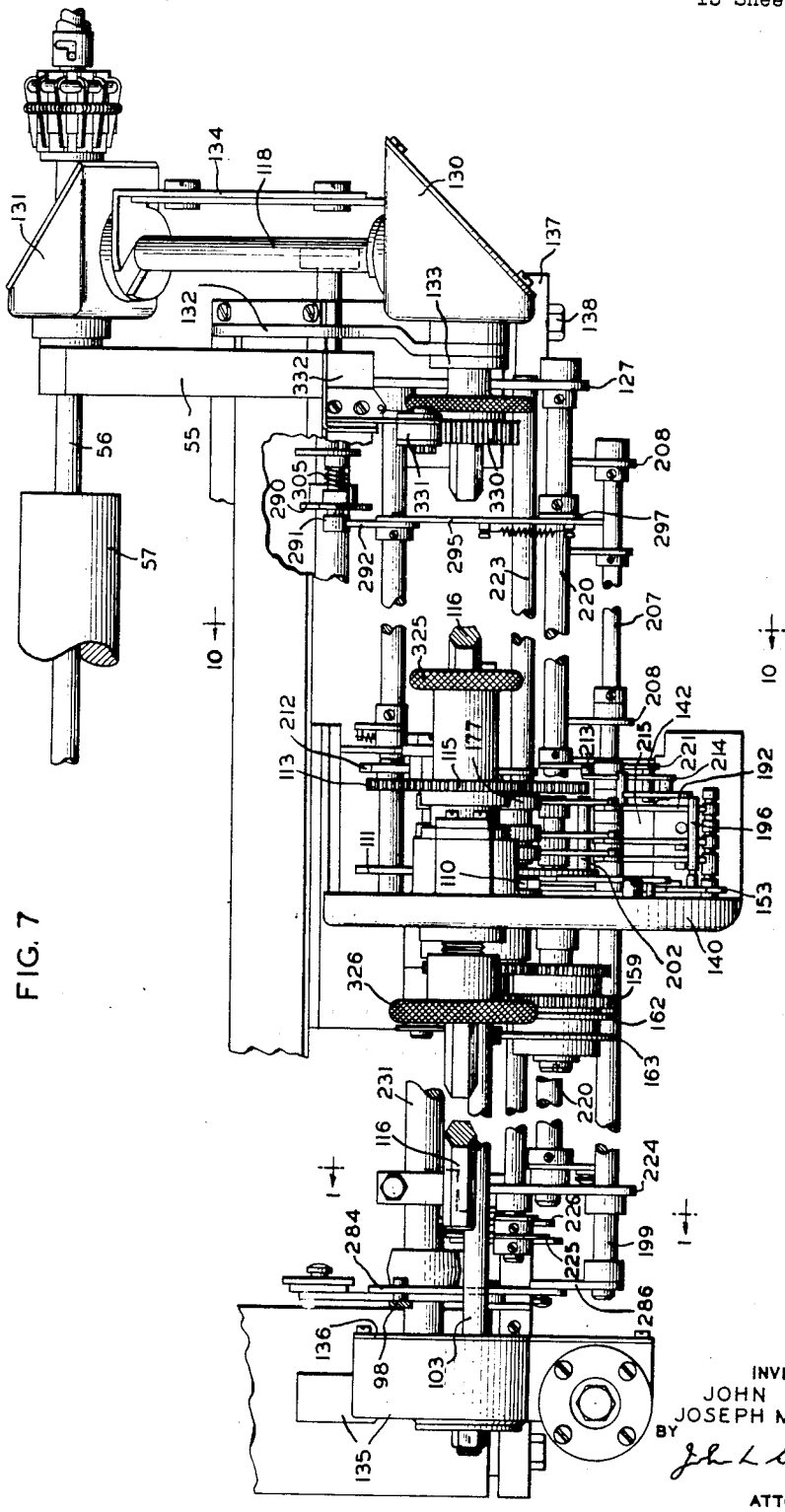
Fig. 7 is a plan view of the long feed mechanism, with some parts broken for foreshortening and with some parts omitted.

The bearings for the pairs of miter gears 117 and 120 are mounted on the end of the carriage itself, so as to permit of setting said carriage in different positions right and left. Gears 117 are journaled in a cast housing 130 and gears 120 in a similar housing 131, the latter having a hub which is supported by the platen shaft 56, and the former having a hub which is supported by a bracket 132 which, in turn, has a flange secured to the rails 54 of the main carriage bar 53. In the present instance, the bracket 132 has rigid therewith a flanged hub or sleeve 133 (Figs. 7 and 9) which sleeve lies in a horizontal bore in the housing 130 and the internal bore of which is the bearing for and supports the end of the counter-shaft 116. The two housings 130 and 131 are connected together by a bail 134, shown as made up of two pieces. As will fully appear hereinafter, the gear 115 is mounted on a sleeve which is journaled in the stationary framework, and the shaft 116 is of polygonal cross section whereby it is, in effect, splined to said sleeve. The carriage may therefore be moved right and left, the shaft sliding in the sleeve; and if it is moved far enough leftward the shaft will be withdrawn from the sleeve altogether.

The left hand carriage supporting bracket 135 (Figs. 7, 8, 3 and 18) has its forward part shaped to support the stationary rail 52 by a block 126 as heretofore, but its rear part is box-like and serves as a housing for the worm wheel 104 and worm 105, and is provided with bearings for the main shaft 103 and the short shaft of the worm 105. It is closed on its left face by a cover plate 136.

A frame bar 137 extends across the back of the machine, being secured to the side frames 51 by screws 138.

The principal frame casting 140 (Figs. 8 and 10) is situated some distance to the left of the end casting 135 and provides bearings for a number of the movable parts of the mechanism. It comprises a right hand web portion with flanges, one of which, 141, is bolted directly to the stationary rail bar 52. Another flange projects downward to become a bracket 142, which is rigidly secured to the bar 137 by an intermediary spacing block 143.

The clutch

Figure 15:
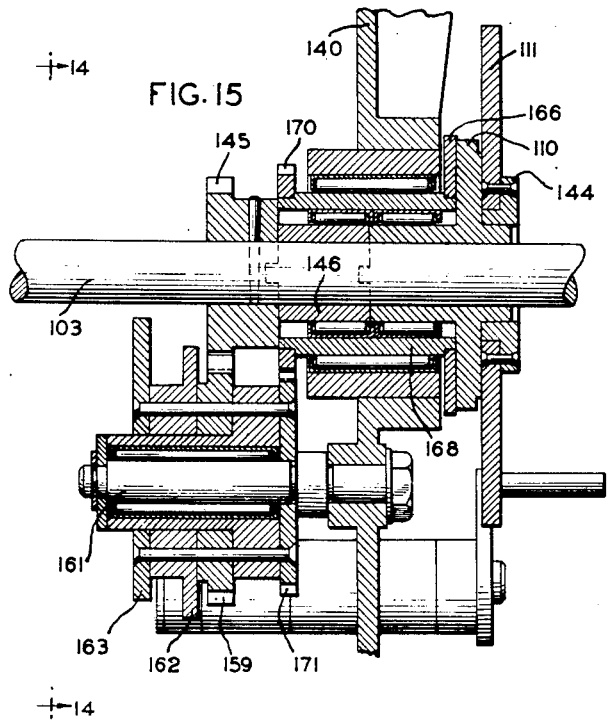
Fig. 15 is a longitudinal sectional view of parts of the mechanism.

As will appear hereinafter, the disk 111 is the primary driving element of the long feed mechanism. Its hub 144 (Figs. 9 and 15) is journaled on a projecting hub portion of the clutch disk 110 which latter is fast on shaft 103 to the left of casting 140. In effect, said hub extends through said casting and is coupled to the hub of a certain gear 145 on the right hand side of the casting and pinned to the shaft. The hubs of wheels 110 and 145 are shown coupled together by interlocking projections through a sleeve 146, to facilitate assembly.

Figure 12:
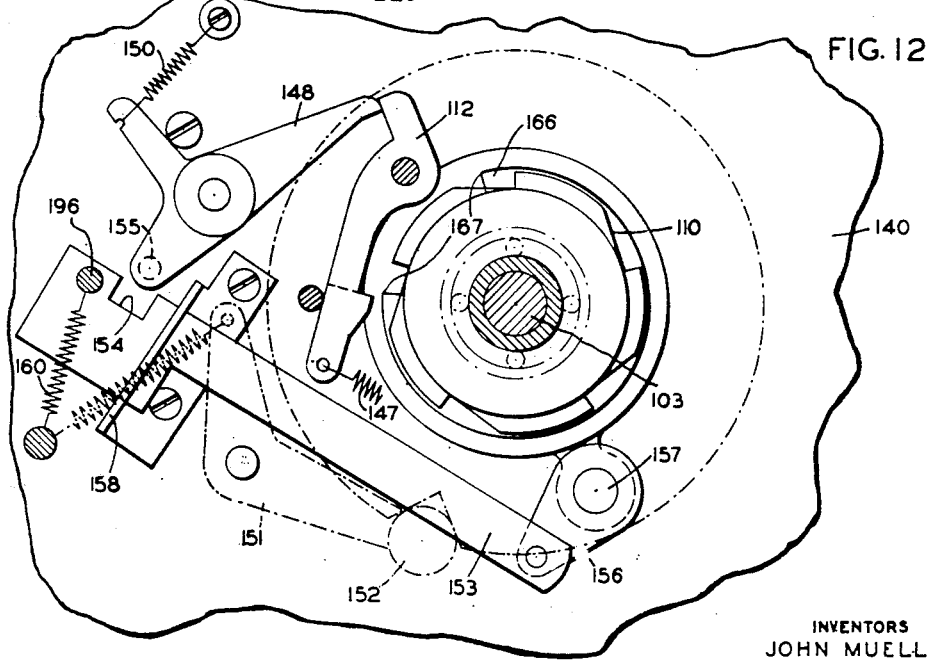
Fig. 12 is a similar view in section on the line 12—12 of Fig. 9.
Figure 13:
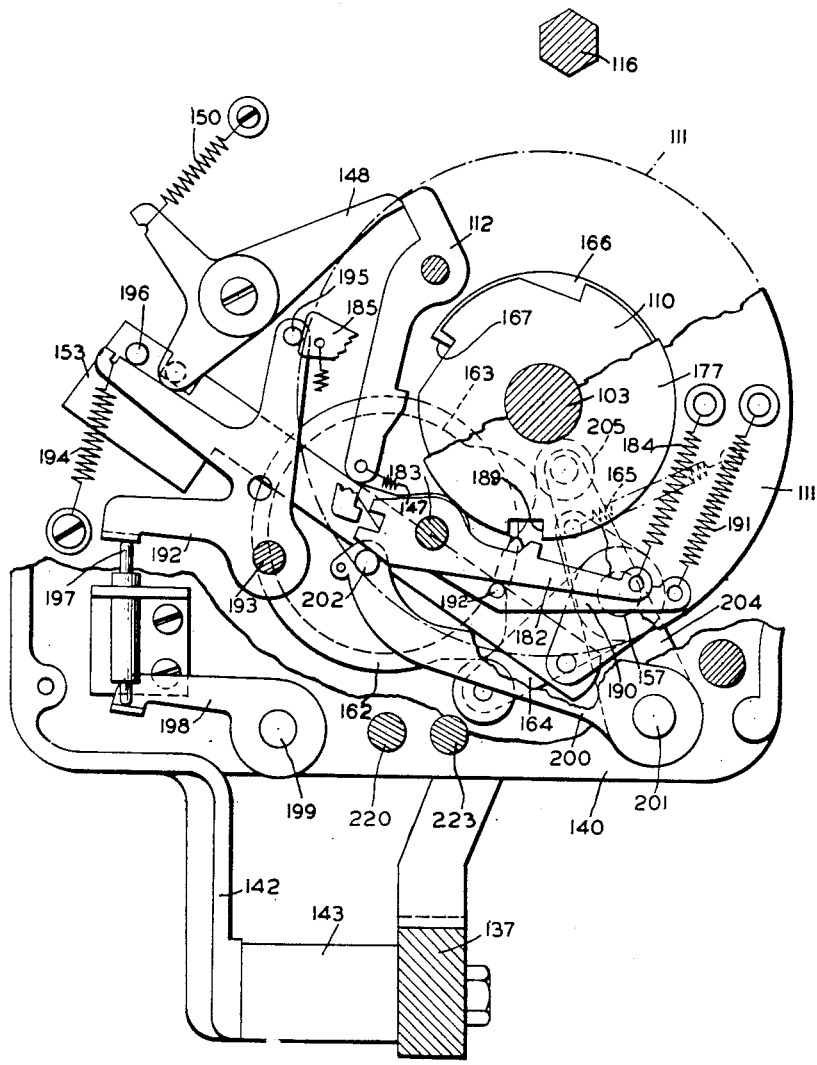
Fig. 13 is a view similar to Fig. 11, but showing the parts at a certain point in the course of an operation.

The clutch dog 112 (Figs. 12 and 13) is pivoted to the face of the disk 111, has a spring 147 and co-operates in the ordinary way with a tripping dog 148, pivoted to the casting 140 and having a spring 150. The disk is yieldingly held in its stop position by a spring urged detent lever 151 (Fig. 11) having a roller 152 engaging in a notch in the disk. The dog 148 is tripped on occasion by a link 153 having a notch 154 adapted to engage a pin 155 on an arm of said dog. Said link is pivoted to an arm 156 on a rock shaft 157 passing through and journaled in the casting 140. Said shaft is rocked counterclockwise (in Fig. 12) and back at a suitable moment once in each machine cycle. This will trip the clutch and start a paper feeding operation at that moment provided the link 153 has been swung up from its normal disengaged position (Fig. 12) to cause the notch 154 to engage the pin 155 (Fig. 13). Various devices may be provided so to swing the link whenever a long feed is required by a particular job of printing. The free end of the link 153 is guided in a slot in a bracket 158 and is drawn to ineffective position by a spring 160. In practice the shaft 157 is oscillated to trip the clutch a little after the moment of printing, and it will be perceived that the link 153 may be swung to effective position at almost any time between oscillations, and the clutch will be released at the right moment.

Figure 14:
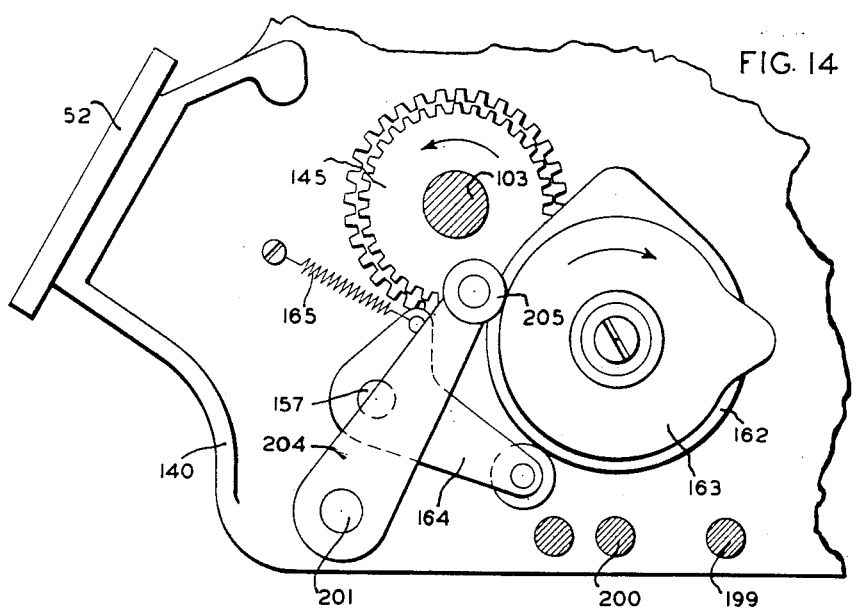
Fig. 14 is a right hand view of a portion of the mechanism, with parts in section on the line 14—14 of Fig. 15.

As the shaft 103 makes one and one-fifth turns per machine cycle, it is not suited to control directly the oscillation of the clutch release shaft 157. For this and another reason that will be explained, it was found desirable to provide another part which rotates once per machine cycle, namely, an assembly journalled on a stub shaft 161 projecting rightward (leftward in Fig. 15) from the casting 140. Said assembly comprises a gear 159 meshing with the gear 145 on shaft 103, a cam 162, and a cam 163. The gears 145, 159 have a ratio of five to six, so that the cams 162 and 163 rotate once per machine cycle. The cam 162 (Fig. 14) has one hump which, soon after the moment of printing, oscillates a follower arm 164 which is fast on the right hand end of the shaft 157 and is influenced by a spring 165.

The cam 162 vibrates the link 153 soon after the time of printing, on every cycle of the machine. This trips the clutch only when, by means to be described hereinafter, said link has been swung up into engagement with the pawl 148 (Fig. 13). When only one line is printed on a form (as in check writing) this will occur on every cycle. The disk 111 will begin its rotation soon after printing a line in one cycle, will complete its rotation and be arrested when the cam 162 has turned only 300° (at 135° of the next cycle) and the disk will stand still (to permit printing) while said cam is making the remaining one sixth of its rotation, at the end of which the clutch will again be tripped; and so on, cycle after cycle. During this one sixth of a machine cycle, the clutch disk 110 will have made one fifth of a rotation, and it must, therefore, have another notch one fifth of its circumference behind the notch previously engaged by the dog 112. In short, said disk has five notches, and, where the long feed operates on every cycle, the clutch dog will, on each cycle, engage the next notch behind the one engaged by it on the preceding cycle. The disk 110 makes one and one fifth turns for each turn on the cam 162.

In order to assure that the clutch is never tripped at the wrong time in the cycle, a device is provided which will now be described. The machine itself will not trip the clutch at the wrong time, but, if the usual cover plate was off it might easily be done by accident or carelessness. A screen in the form of a disk 166 (Figs. 12 and 15) lies beside the clutch disk 110 and the tooth of the pawl 112 is broad enough to ride on both disks. Disk 166 is circular except for a notch 167 occupying about one fifth of its perimeter; so that only one of the notches of disk 110 is ever exposed at a time. The disk 166 is fast on the end of a sleeve 168 passing through the casting 140 and surrounding the shaft 103. At its right hand end said sleeve carries a gear 170 meshing with a gear 171 forming part of the assembly 159, 162, 163, which makes one rotation per machine cycle. Gears 170 and 171 have a 1 to 1 ratio so that the screen disk 166 makes one turn per cycle; and it is so disposed that its notch 167 is in register with the pawl 112 at the moment when said pawl is released by the cam 162. If the pawl 148 was inadvertently tripped at the wrong time the pawl 112 would ride on the screen disk, allowing one or more clutch notches to pass under it, and would drop into the right notch at the correct time.

*Differential drive mechanism*

In the illustrated instance of the invention, the mechanism is adapted to handle a web of paper divided into forms such as shown in Fig. 4. This form is eight and one half inches long, equal to 51 single line spaces; and these 51 spaces are numbered in the left hand margin. The "heading" consists of the name and address of a customer, space being provided for 5 lines, three of which are shown printed, beginning at space #6. Each line is printed from a separate card. This heading is single spaced. The items are double spaced, being printed on the even numbered spaces, beginning with #14. Provision is made for fifteen such lines, the last on space #42. In the following description it will be convenient to refer to these as item lines numbered 1–15, inclusive.

As explained hereinbefore, the platen is turned to advance the paper to different extents, through the gear 113. This gear is attached to or is part of a unit which also comprises a "line-finding" drum 172 (Fig. 9) loosely, and preferably detachably, mounted on the drive shaft 103 adjacent the disk 111. A washer 173 separates the two and serves to retain the hub of said disk on the hub of clutch disk 110. Said unit comprises a sleeve 174 journaled on the shaft 103. The line finding drum is made up of several disks (three such disks, 175, 176 and 177 being shown in the present instance) and some spacing washers 178. The first disk 175 and the gear 113 are riveted on the reduced ends of the sleeve 174, and, after all of the disks are properly adjusted as will be explained, the parts of the unit may be rigidly secured together as by rivets 180.

The gearing between the gear 113 and the platen is so proportioned that one complete rotation of said gear feeds the web of paper a distance equal to the length of a form, fifty-one single line spaces in the present instance. The line space ratchet 70 has thirty teeth, and the gearing between the platen shaft and the shaft 116 is in the ratio of one to one. The gears 113 and 115 therefore have a ratio of fifty-one to thirty. All this being so, when the paper is properly positioned on the platen and any particular line space of a form is at the printing line, the gear 113 and the drum including the line finding disks 175, 176 and 177 occupy a definite angular position (Figs. 20, 21 and 22). Thus the first heading line of a form (space #6) is brought to printing position by turning the disk 175 until the notch 181 stands in the position shown in Fig. 11. Each of the disks has such a notch, and the disks may all be alike except with respect to the angular positions they occupy in the drum.

In making up a drum for a particular form, line disks of the requisite number are provided, and each is adjusted angularly until its notch 179 occupies the angular position appropriate to its line on the paper, and all of the disks are then rigidly secured, as by the rivets 180.

Figure 11:
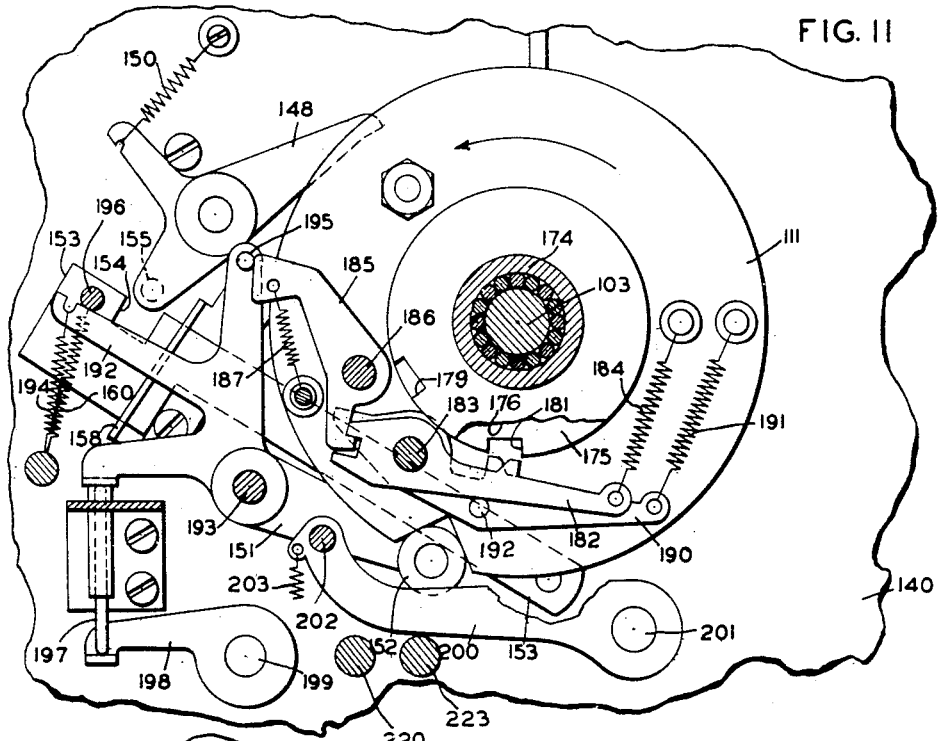
Fig. 11 is a partial view in section on the line 11—11 of Fig. 9.

Each line finding disk 175, etc., is driven on occasion by its one of several line pawls 182 (Fig. 11) pivoted on a stud 183 projecting from the drive disk 111 across the drum 172. Each of said line pawls is drawn toward its line disk by a spring 184 and is normally held out of engagement by a latch lever 185 pivoted to disk 111 on a stud or post 186 and influenced by a spring 187. Figs. 11 and 13 show the disk 111, a pawl 182 and its latch 185 in their stop positions. If now the latch 185 for the line disk 176 (the proximate one in Fig. 11) be released, the spring 184 will draw the tooth of the pawl 182 into contact with the periphery of the disk 176; and when thereafter the pawl 148 is tripped to close the clutch, disk 111 will make a complete rotation and be arrested in its normal position. During this rotation, pawl 182 will ride idly on the disk 176 until it falls into the notch 179, when it will rotate the drum 172 (Fig. 9) and, through the described train of gearing, will rotate the platen. The notch 179 of disk 176 will thus be brought to the position occupied in Fig. 11 by the notch 181 of disk 175; and the line unit, including the gear 113, will be rotated to an extent equal to the angular distance between the two notches 179 and 181 shown in Fig. 11, that is to say to a distance equivalent to eight single line spaces, feeding the paper from space #6 to space #14.

In order to prevent overthrow of the parts, each line pawl 182 has associated therewith an auxiliary pawl 190 pivoted on the post 183 and having a spring 191 which presses a stud 192 on said pawl into contact with the pawl 182, so that the latch lever 185 holds both pawls away from the disk. The tooth of the pawl 182 is abrupt on its outer edge and that of pawl 190 on its inner edge. In operation both teeth rest on the periphery of the line disk until the notch is reached, when the pawl 182 first drops and a moment later the pawl 190 drops, the two teeth of the two pawls together occupying the whole length of the notch. When the disk 111 reaches the end of a rotation, it is positively arrested by the dog 148 and is forcibly retained in stop position by the detent 151, 152; and the pawl 190 positively prevents the gears 113, etc., from overthrowing ahead of it. The pawls are not disengaged until after the drum has come to rest.

In order to trip the latches 185 selectively, trip levers 192 are pivoted on a fixed post 193 and urged counter-clockwise in Figs. 11 and 13 by springs 194. The lever 192 shown in Figs. 11 and 13 is the extreme right hand one and is associated with a notched disc 175 which in this particular machine is the one that is operated following the printing of a total and which feeds the paper to the first heading line of the next form. Said lever has three arms, the upstanding one of which has a pin 195 adapted when the lever 192 is rocked clockwise to trip its latch lever 185. Said lever 192 has a second arm for acting on a post 196 projecting from the free end of the release link 153 and adapted when the release lever is operated to swing said link 153 into operative engagement with the pin 155 on the clutch-release lever 148. The lever 192 has a third arm which is operated on occasion by a pin 197 which in turn is operated by an arm 198 on a certain rock shaft 199. This particular shaft is herein called the "total trip" shaft and, as will be described hereinafter, it is rocked automatically preparatory to a total taking cycle. In general, these trip levers may be operated by any suitable means according to the requirements of the work and the construction of the machine. It will be noted that each of them releases one of the latches 185 and that all of them set the link 153 into engagement with the release lever 148.

Means are provided to restore the line pawls 182 and 190 after the line drum and the gear 113 have come to rest. Said means includes an arm 200 mounted on a rock shaft 201 (Figs. 11 and 13) and having a post 202 extending beneath all of the line levers 182 behind their pivot 183 so that rocking said lever clockwise from the position of Fig. 11 to that of Fig. 13 disengages any of said levers. Arm 200 is influenced by a spring 203.

The shaft 201 is journaled in and passes through the frame 140 and it carries an arm 204 (Figs. 13 and 14) having a follower roller bearing on the cam 163 which is a part of the unit hereinbefore described and which also includes the cam 162. In Fig. 13 bracket 140 has been omitted and the parts are there shown at the moment in the cycle in which the roller 205 rests on the top of the hump of cam 163. This moment has been chosen on account of a certain peculiarity of timing which will be explained hereinafter. It will be noted that at this moment the roller on the follower lever 164, which controls the shaft 157 and the link 153, has not quite reached the top of the hump on the cam 162 and that, therefore, the release dog 148 has not yet moved quite clear of the pawl 112. In the specific machine illustrated in the drawing, this figure shows the parts at 168° of the cycle. At some time previously, the pawls 182, 190 had been allowed, by the action of lever 192, to engage the disk 175. Printing had occurred at about 160°. Cam 162 will release pawl 148 at 180°. It will be noted that in Fig. 13 a tooth of the clutch disc 110 is about 27 degrees removed from the tooth of clutch pawl 112. These two teeth will collide and the disk 111 be started into rotation at 195° of the cycle. Before that time the hump of the cam 163 will have passed the roller 205 entirely and the lever 200 will have resumed its normal position and the line pawls 182 and 190 will have returned into engagement with the disk 175.

The second line disk, namely, the disk 176, is immediately controlled by devices exactly like those above described for the disk 175 but the trip lever 192 is rocked by the sensing of a control hole in a card. This may be useful in various ways. In the present instance, the control hole is in the last of a series of heading cards; and the notch 181 of this disk is so located as to feed the paper to the first item line of the form.

The mechanism for rocking this lever 192 includes a long pin 206 (Figs. 5, 8 and 10) pivoted to an arm 189 fast on one end of a rock shaft 207 which shaft is journaled in two brackets 208 secured to the frame bar 137. Another arm on said shaft is operated by a link 209, which is operated in a familiar way by a Bowden wire in the translator of the machine.

*Capacity feed*

The third disk 177 is for use when the number of items to be printed equals or exceeds the capacity of the form; and this disk therefore feeds the paper to the first item line of the next form skipping the heading space. The disk 176 also feeds the paper to that line, and the notches 181 and 189 in these two disks are therefore arranged in the same angular position.

The tripping lever 192C for the disk 177 is arranged to be actuated by the act of feeding the paper to the last printing line. A cam plate 212, Fig. 10, is mounted on the face of the gear 113 in such a position that when the paper steps to said last line position, said cam acts on a roller 213 to deflect a lever 214 pivoted on the post 193 and thereby rocks the lever 192C in preparation for a paper feeding operation.

Figure 10:
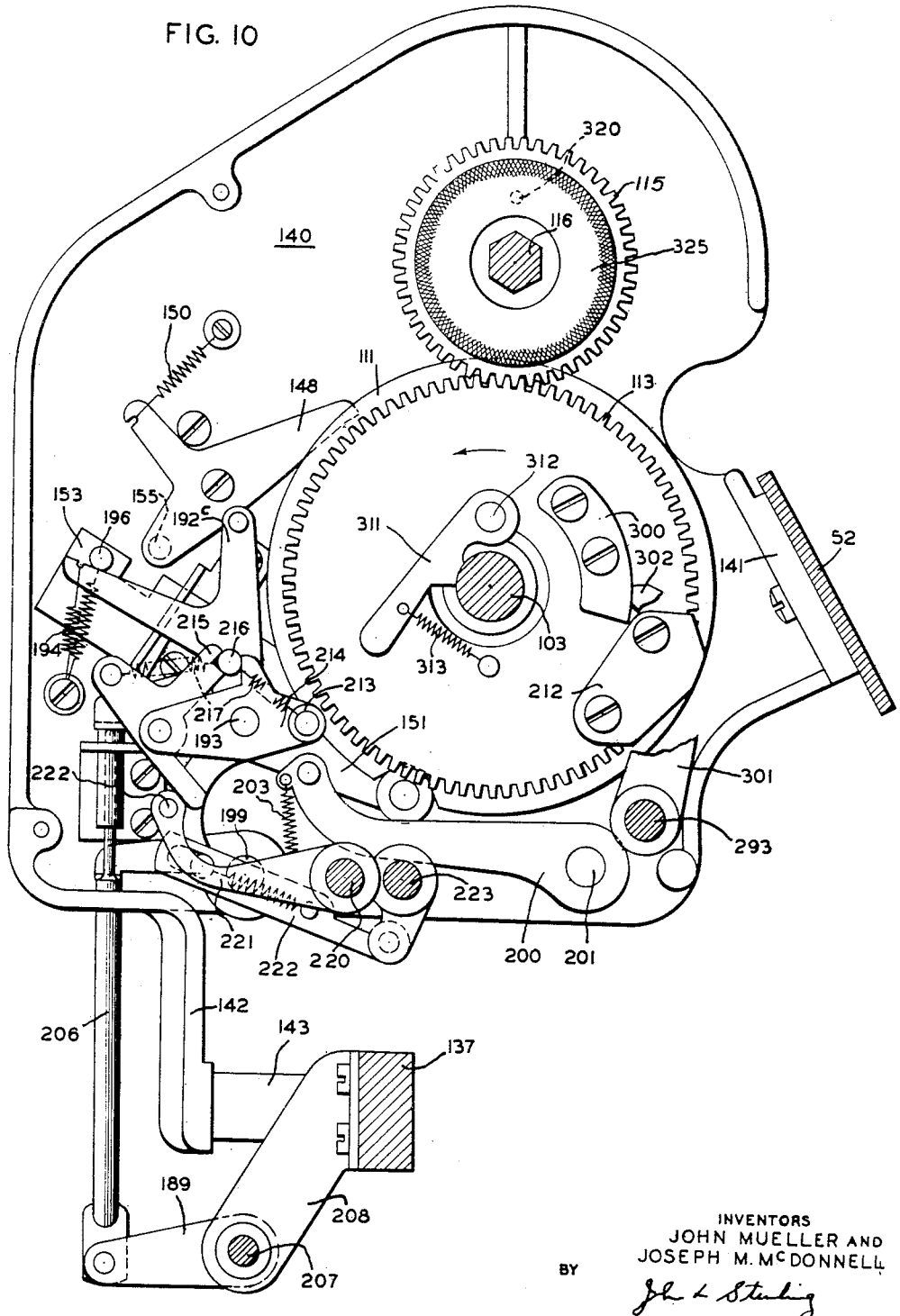
Fig. 10 is a front to rear vertical section of the main portion of the mechanism, in section on the line 10—10 of Fig. 7.

As shown in Fig. 10 the lever 214 has pivoted thereto a pawl 215 engaging a pin 216 on the lever 192C, and springs 217 pinch the lever and the pawl together on said pin. The construction is such that the levers 214 and 192C rock together as one and the roller 213 is in effect on an arm of the lever 192C. In some installations this may suffice without further elaboration of the mechanism. The operation would be as follows: assuming, for example, that the form has a capacity of fifteen item lines as shown in Fig. 4, after printing the fourteenth card the paper would be line-spaced to the fifteenth position, tripping the lever 192C. If the group includes, say eighteen item cards, the fifteenth one would be printed on line fifteen in the next cycle and the paper would then feed to the first item line of the next form, where the printing of the three remaining items and the total of the group would be resumed. If the group contained exactly fifteen cards, then after the fifteenth card was printed in the fifteenth item cycle, the paper would feed up to the first item line of the next form. Meanwhile in the last half of the fifteenth cycle, the first card of the next group would be sensed initiating a total-taking operation, and the total would be printed alone on the second form. In case there happened to be just fourteen cards in the group under consideration then the first card of the new group would be sensed in the latter half of the fourteenth cycle, initiating a total-taking operation. The paper would however be line-spaced resulting during the idle cycle of the total-taking operation in the paper being fed to the first item line of the next form where the total would be printed. The pulling of the total shaft of the machine would cause disk 175 to feed the paper to the first heading line of the next succeeding form, leaving the total as the sole line printed on the second form. In some installations this mode of operation may be acceptable.

In most installations however it is preferred that under the conditions last mentioned the total be printed at the bottom of the first form. Means are therefore provided to nullify the paper feeding operation in case the fifteenth card should prove to be the first card of a new group. The fifteenth card is sensed in the last half of the cycle in which the fourteenth card is printed and the change of designation is detected near the end of that cycle, resulting in rotation of a cam shaft 218 (Fig. 16) in the total taking control mechanism of the machine. The first effect of this rotation is to "pull" a certain "credit balance shaft," and this is availed of to nullify the paper feeding operation. By means which will be described presently, said credit balance shaft is connected with a shaft 220 (Fig. 10) in the lower part of the paper feed mechanism and said shaft has an arm 221 having a pin 222 which acts on an arm of the pawl 215 to release the lever 192C from said pawl. Said lever returns to its normal position, so that when later on the cam 162 operates the link 153, the latter will have been disengaged from the trip pawl 148 and no paper feed will occur. The total will therefore be printed at the bottom of the first form. During the total taking operation, the total trip shaft 199 will be pulled and the paper will be fed to the first heading line of the next form.

With the mechanism as thus far described, in case the sixteenth card proved to be the first of a new group, then the total would be printed alone on the second form and for the purposes of some users this may be acceptable. In fact, most prior compensating feeds operate to that effect.

There is however sometimes an objection to a total appearing alone on a form. For example, from each item card there may be printed not only the amount to be computed but also designatory matter identifying the account to which the item belongs; and this designatory matter is not printed on the total cycle. Where the total appears alone on a form therefore there is nothing printed on that form to identify the account to which the total relates. Some users, therefore, insist that always at least one item be printed on the same form with the total. In meeting this requirement we are confronted with the fact that if there happens to be exactly fifteen item cards in a group the paper feeding mechanism thus far described would begin to operate soon after the fifteenth item was printed and before the machine discovered near the end of the cycle that the sixteenth card was of a new group. In order to overcome this difficulty, means are provided, according to which, if the fifteenth card is of a new designation, the total will be printed at the bottom of the form as above described; but if it be of the old designation the machine will be caused to execute a blank cycle in which the paper will be fed to the first item line of the next form, where the fifteenth item will be printed on the cycle following said blank cycle. It is thus impossible that the last card of a group be printed at the bottom of a form and a total printed by itself on a form. This reduces to fourteen the number of items that can be printed on a form; but the total is still printed on the fifteenth line when there are exactly fourteen items in a group.

*Blank cycle mechanism*

Figure 16:
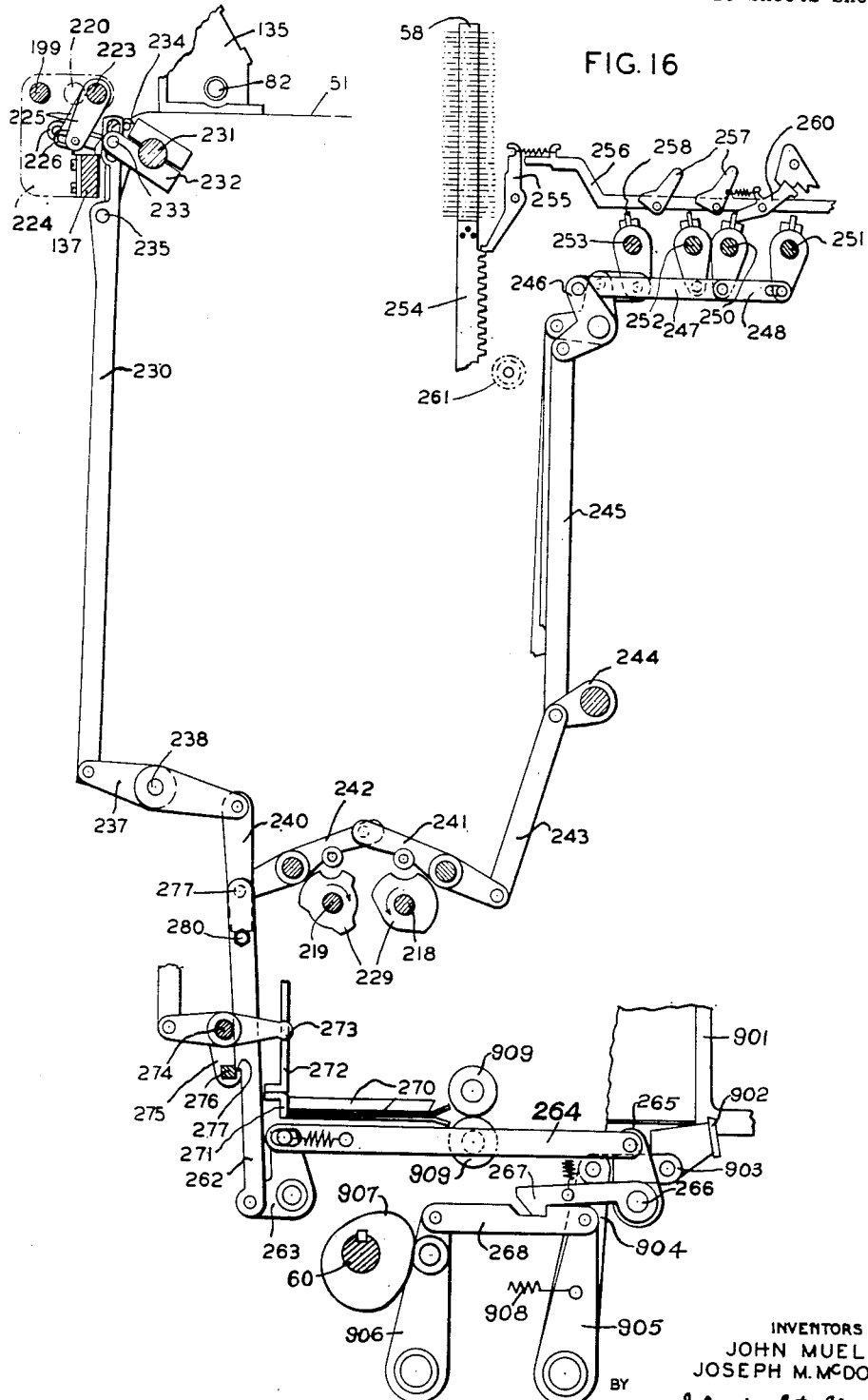
Fig. 16 is a more or less diagrammatic elevation, on a small scale, of the means whereby the long feed mechanism may cause the tabulating machine to execute a blank stroke.
Figure 17:
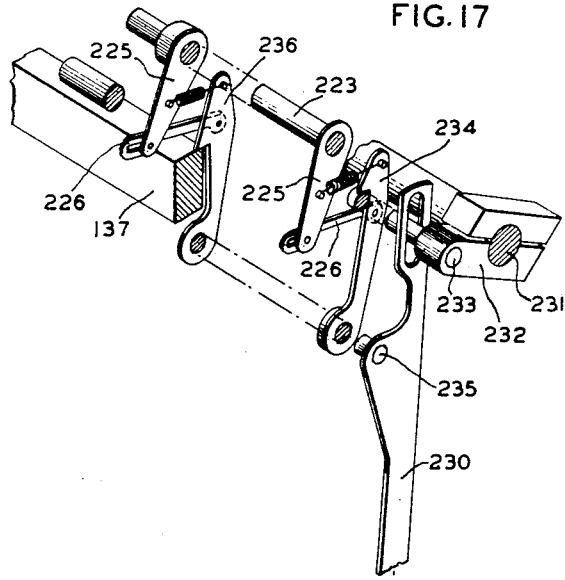
Fig. 17 is an exploded isometric view of some of the mechanism shown in Fig. 16.
Figure 18:
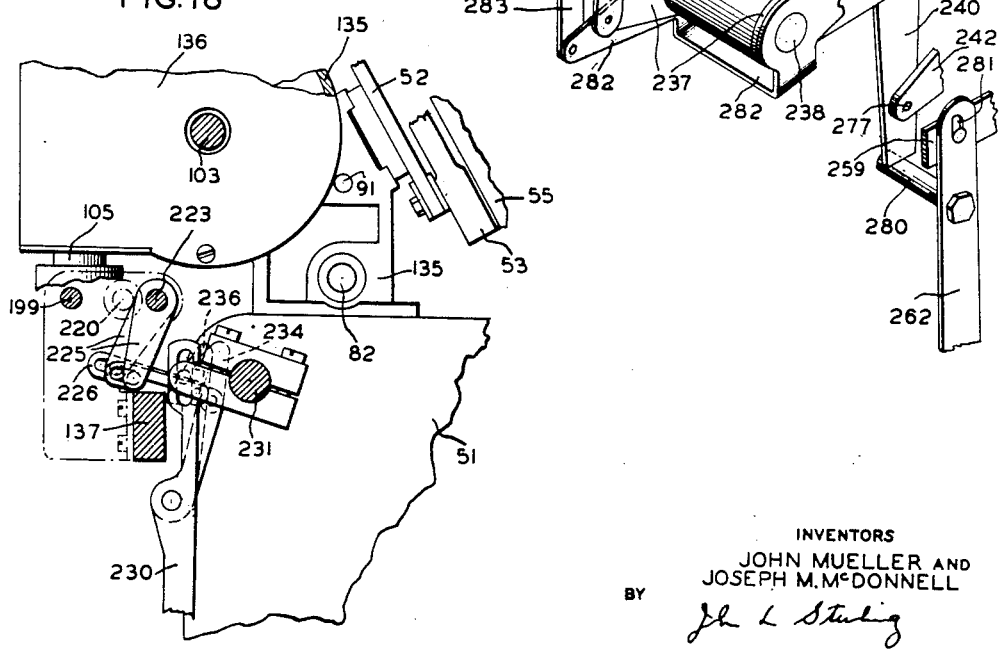
Fig. 18 is a view similar to Fig. 1 but showing the parts in normal position.

The lever 192C (Fig. 10) which prepares for a long paper feed at the end of a form, has a depending arm which, through a link 222 rocks a "capacity" shaft 223. This shaft at its left end (right end in Figs. 7 and 8) is journaled in the bracket 127, it passes through the bracket 140, and at its right end it is journaled in the same bracket 224 as the shafts 199 and 220 (Fig. 16). Said bracket is secured to the frame bar 137. The parts controlled by this shaft are shown in normal (inactive) position in Fig. 18, in operated positions in Figs. 1 and 16 and in operated position in the exploded isometric view, Fig. 17. Near its right hand end, the shaft 223 carries two arms 225 which operate two links 226 by pin, slot and spring. The work of setting the machine for a blank cycle is performed by a link 230 which, in the illustrated machine, is conveniently operated by an existing rock shaft 231. The latter is one of two shafts which are rocked clockwise as viewed in the drawing in the last part of each machine cycle, to restore the stops which arrest the type bars. We have secured to said shaft an arm 232 having a pin 233 projecting therefrom into position to be engaged by a hook 234 pivoted at 235 to the link 230 and drawn into engagement by one of the links 226. The pin 233 passes through a long guide slot in the link 230. A second hook 236 pivoted to link 230 at 235, normally lies just behind the frame bar 137, and is connected with the second link 226. When the capacity shaft 223 is rocked clockwise, the hook 234 is hooked to the pin 233 and the second hook 236 has its nose pressed by its spring against the face of the bar 137. When, then, shaft 231 is rocked, pin 233 and hook 234 lift link 230 until the hook 236 snaps over the top of the bar, holding link 230 in its pulled position until the capacity shaft returns to normal, when it releases the hooks and allows the link to fall. A lever 237 pivoted on a post 238, has two off-set arms to one of which the link 230 is pivoted and to the other of which is pivoted a push link 240.

A "blank cycle" of the Powers machine involves three things, viz., (a) the fifteenth card is held in the sensing chamber to be re-sensed so as to have its data printed in the next succeeding cycle; (b) the card picker is locked during the blank cycle; and (c) the type bars are prevented from rising so that said data will not be printed in the blank cycle. The link 240 is connected up to perform these functions.

The total taking control mechanism of the Powers machine includes two cam shafts, viz., a total shaft 218 (Fig. 16) and a grand total shaft 219, one of which, on a change of designation is set into rotation at the beginning of a cycle, said shafts being geared to make one rotation, the total shaft in two machine cycles and the grand total shaft in three. The so called "slam bail" cams 229 shown in Fig. 16 are adapted to keep respective follower levers 241 and 242, in operated position through the blank cycle of a total taking operation. The two levers are pivoted on fixed posts and articulated to rock together. When rocked, lever 241 operates through link 243, lever 244, link 245, lever 246 and link 247 to "pull" (rock clockwise) the "slam bail" shaft 250; and this, through a link 248, pulls the "designation" shaft 251. Behind the shafts 251 and 250 are a total shaft 252 and a grand total shaft 253. In Fig. 16 the latter two shafts are in normal position and the former two are pulled. Each type bar 254 may be restrained against rising to printing position by a "slam bail" pawl 255, controlled by a bar 256 having two coupling devices 257 hand settable into and out of position to be actuated by blades 258 carried by the total shaft 252 and grand total shaft 253. In Fig. 16 these are shown set inactive. A third coupler 260 is set to be operated by the slam bail shaft 250, and it is shown so set and so operated; and the pawl 255 is set to restraining position, to prevent numbers from being printed by said type bar and added on the accumulator 261. Any coupler 260 can also be rocked so as to be operated by the blade 258 of the "designation" shaft 251. In practice it is usual to set all couplers 260 in adding fields as shown so as to restrain their type bars, and in all fields used for designation or alphabetic printing to set said coupler into co-operation with the designation shaft 251. It results that on blank cycles none of said type bars rises.

Card feed is effected from a hopper 901 (Fig. 16) by a picker 902, which, through a linkage 903, 904, 905, 268, 906, is operated by a cam 907 on the base main shaft 60, and by a spring 908. Feed rolls 909 convey the cards to the sensing chamber 270. The feed is stopped in total taking operations by cams (not shown) one on each of the shafts 218 and 219 and acting on a follower lever 259 (Fig. 17) to push downward a link 262 (Figs. 16 and 17) which, through bell crank 263, link 264 and arm 265, rocks a shaft 266 and swings a latch 267 into position to lock the link 268 of the mechanism which operates the card picker. This interrupts the feeding of new cards from the hopper.

The sensing chamber comprises two horizontal plates 270 between which the card is fed and where it is arrested by the card stop 271. The latter consists of a bar having upright arms 272 engaged by arms 273 on a shaft 274, the stop being moved down to stopping position and up to releasing position by rocking said shaft. Said shaft has fast thereon an arm 275 with a lug 276 adapted to contact with the rear edge of the link 262. Said link has a shoulder 277 so made that, when the link 262 is in its normal upper position the shaft 264 can rock to releasing position, but when said link is depressed as in Fig. 16, the link blocks movement of lug 276 and locks the card stop in its stopping position.

All of this total taking control mechanism is well known and it is fully described in the Patent No. 2,323,816, except that the means for locking the card stop as here shown differs in detail from the patent.

The blank stroke mechanism above briefly described, is operated by the mechanism of the present invention as follows: The follower lever 242 (Figs. 16 and 17) is extended to include a rear arm which is pivoted at 277 to the link 240, so that, when said link is depressed as above described and as shown in Fig. 16, the slam bail shaft 250 and designation shaft 251 are pulled, the follower levers 242 and 241 being lifted off of their cams. When said follower levers are rocked in total taking, the link 230 is vibrated up and down, but the hooks 234 and 236 are then in inactive position and such vibration is without effect.

The link 262 has a pin 280 extending therefrom beneath the lower end of the link 240, which, when operated, thereby depresses the link to stop the card feed as described above. In order that the paper feed mechanism may depress the link 262 independently of the follower lever 259, the latter is connected with the former by pin and slot 281.

The mode of operation of the capacity feed mechanism differs somewhat, depending on the number of cards in a group, or, in other words on the number of items to be printed. It can best be understood by reference to the time chart, Fig. 22.

In case there are fifteen or more cards (items) in a group in the fourteenth item cycle, the fourteenth item is printed at 160°. At 168°, the cam 163 operates the pawl-restoring arm 200, idly. At 180°, cam 162 vibrates release link 153, idly. In the second half cycle, the fourteenth item is added and the fifteenth card is sensed. At 184°–255°, the paper is line spaced to the fifteenth or extra line, causing cam 212 (Fig. 10) to rock trip lever 192C. This engages release link 153 with pin 155 and releases pawls 182 and 190 for engagement with the line disk 177. It also, through link 222, pulls the capacity shaft 223, setting hooks 234, 236 (Fig. 17) for operation. At 318°, shaft 231 (Figs. 16 and 17) rocks and, through link 230 and the described mechanism, pulls the slam bail shaft to prevent the rise of the type bars, and locks the card picker and card stop, thus conditioning the machine for a blank cycle.

In the fifteenth cycle no type bars rise and no card is fed, the fifteenth card remaining in the sensing chamber. At 168° the pawl restoring arm 200 vibrates, momentarily restoring the feed pawls 182 and 190; but as their latches 185 are held released, they immediately return to contact with the disk 177. At 180° the clutch is tripped by cam 162, and at 195° the disk 111 begins its rotation.

In the sixteenth cycle, the rotation of the disk 111 and the resulting feed of the paper (Fig. 4) to space #14 (first item line of the next form), is completed at 135°. During this feed, cam 212 on gear 113, passed beyond follower 213, and release lever 192C returned to normal position; as did also the capacity shaft 223. The hooks 234 and 236 therefore returned to inactive position, allowing the machine control devices to return to normal. The machine resumes normal operation, printing the fifteenth item on the first item line of the new form.

In the case where there are just fourteen items in a group, the operation in the fourteenth cycle is the same as above described, except that the fifteenth card, then sensed, is of a new group and the change of designation is detected at about 350°, setting the total control shaft 218 (Fig. 16) into rotation as fully described in Patent 2,323,816. Said shaft bears a cam designed to operate a certain "credit balance" shaft, that is to say it pulls the latter very early in the blank stroke of a total taking operation and holds it pulled until near the end of the total cycle. The follower levers of this cam have been modified the same as the levers 241 and 242 (Fig. 16) and, parallel to the link 240 is another which operates an off-set lever 282 (Figs. 17 and 23) pivoted on the post 238. This lever, by a link 283 (Figs. 1, 17 and 23) rocks the "credit balance" shaft 220 of the paper feed mechanism (Fig. 10), which, by arm 221, trips the pawl 215 free of the pin 216, causing trip lever 192C to be restored to inactive (normal) position. The release link 153 then drops free of the pin 155, and the capacity shaft 223 returns to normal, setting the hooks 234 and 236 back to inactive position. The blank stroke devices controlled by trip lever 192C are thus nullified, but the fifteenth is a blank cycle, due to the action of the totaling mechanism.

In said fifteenth cycle, at 168°, the restoring arm 200 is operated; restoring the pawls 182 and 198, which are then retained by their latch 185. At 180°, the clutch release link 153 is operated, but idly. In short, this becomes the blank stroke of a total taking operation. In the normal blank stroke, however, the paper would be line spaced to the sixteenth line of its item field. This is not desired, and means presently to be described are provided to prevent it. In the latter part of this stroke, the total shaft 252 is pulled, accompanied by an upward motion of the link 98 (Fig. 3). A pin 279 rocks a lever 284, pivoted on a bracket 285, which lever rocks an arm 286 fast on the total trip shaft 199 hereinbefore described. This releases the total pawl 182 for engagement with line disk 175 and sets the paper feed mechanism for a feed to the first heading line of the next form, as hereinbefore described. The total is therefore printed on the fifteenth item line, and the paper is then fed to start the printing of a new form.

*Control of line space by long feed mechanism*

Means are provided whereby under certain conditions the long feed mechanism may vary the extent of line spacing or block it altogether, as in the instance just above mentioned where it prevents line spacing on the blank stroke. It will be recalled that the extent of line space is regulated by settings of the stop plate 98 (Fig. 3) to arrest differentially the advance rocking of the line space operating shaft 82. Means to the same effect are provided in the long feed mechanism (Fig. 6) where said shaft is provided with an arm 290 having a pin 291 adapted to be variably arrested by a stop arm 292. The latter is fast on a "line block" rock shaft 293 journaled in the frame plate 127 and in the middle bracket 140. In the present instance the arm 292 is shown with two steps 294 in its end. The arm 292 is normally out of the path of the pin 291 and has no effect. In Fig. 6 it is shown rocked clockwise to bring its lower step into said path, affording single line spacing; and it may be further rocked to bring the higher step into the path of the pin, preventing line spacing altogether. Said arm 292 has pivoted thereto a link 295 which link is connected at 296 by pin and slot and spring to an arm 297 on the credit balance shaft 220. When said shaft is rocked clockwise by the totaling mechanism as above described, it rocks the arm 292 to bring the high step thereof into the path of the pin 291 to prevent line spacing on the blank stroke. It would also prevent line spacing on the total stroke, but that is immaterial because a long feed is started at that time.

In order to change temporarily from double to single line spacing, means may be provided to swing the stop arm 292 to its middle position where the lower step 294 is in the path of the pin 291, as shown, in Fig. 6. In the present instance, it is desired to single space the several lines of the heading as shown in Fig. 4. To this end a cam 300 is mounted on the face of the gear 113 and spaced away from said gear out of the plane of the cam 212. An arm 301 fast on the line block shaft 293, has a branch 302 which acts as a follower for said cam and is deflected clockwise by the latter. The cam is so located on the gear and is of such a length that it deflects said arm as the paper approaches the first line of the heading and holds it deflected until the last heading line has passed the printing position, when the follower drops off of the cam and the stop arm 292 returns to its normal ineffective position. Preferably the follower branch 302 of the arm is made as a separate piece, pivoted to the arm and held in normal position by a spring 303 and stop pin 304. The branch thus provided is rigid with the arm 301 under proper operation, but can yield if and when, in manipulating the machine, the wheel 113 is turned backwards.

In order that the line block mechanism may be disabled and enabled at will, the pin 291 is made settable out of and into the plane of the arm 292. Said pin is made in the form of a plunger slidable right and left in a boss on the arm 290 and pressed toward the right in Fig. 8 by a spring 305, compressed between said boss and a collar on the end of the plunger, which spring withdraws the pin 291 out of range of the arm 292. The pin is pushed to operative position by a disk 306 (Fig. 8) on the end of a plunger rod 307 which slides in a housing 308 secured to the bracket plate 127. Said rod extends through the carriage-supporting bracket 125 and has a milled head by which it may be manipulated. A bayonet joint comprising a pin 310 projecting from the rod 307 through an L-slot in the housing 308, permits the required setting of the rod. When the shaft 82 is rocked, the end of the plunger pin 291 rubs across the face of the disk 306.

It will be apparent that this line block mechanism may be variously modified and variously controlled to provide whatever control of line spacing may be needed in handling forms.

*Forms of different lengths*

The gear ratio between the gear 113 and the platen may be varied so as to handle forms of different lengths. The instance illustrated in the drawing was designed for forms of a length of eight and one half inches, equal to fifty one single line spaces; and in another instance the gears 113 and 115 would be made of relative diameters appropriate to the forms to be used.

If desired, interchangeable pairs of gears may be provided, and such provision is made in the present instance. The unit comprising the gear 113 and the disks 175, 176 and 177, is made readily removable, being merely slipped on the end of the shaft 103 and held in place by a dog 311 (Figs. 9 and 10) pivoted to the gear at 312 and drawn by a spring 313 into a groove 314 in the shaft 103. On lifting the dog out of the groove, the unit may be slipped off the end of the shaft and replaced by another. The shaft 103 is shown with a second groove 315, so that, when the machine is to be used for other purposes or when making adjustments, the unit may be moved off to the right in Fig. 9 out of range of the gear 115 and other cooperating parts, and retained there by the dog 311.

The gear 115 is also interchangeable. It is mounted on a long hub 316 which extends through and takes a bearing in the frame piece 140, where endwise movement of it is prevented by a flange 317 of said hub contacting said frame and also a guard piece 318 secured to the frame. The gear 115 is simply slipped on to the end of the hub and into engagement with a stud 320 acting as a key; and it is secured in place by a sleeve nut 325. The latter is provided with a knurled head to facilitate manipulation of it without tools. The shaft 116 and the bore of the hub 316 are of like polygonal form. To remove the gear 115, said shaft is pulled out of the hub by sliding the carriage (to which the bearing of said shaft at the right of Fig. 9 is secured); and removing the sleeve nut 316. The gear may then be removed and replaced by another of different size.

In the drawing, the sleeve 316 is shown elongated to project beyond the frame 140, where it is threaded and slit longitudinally and coned on its end, and provided with a nut 326, the whole constituting a chuck similar to those used in machine tools. When the parts are all assembled, tightening the nut 326 clamps the hub firmly and rigidly to the shaft. This chuck is a refinement which is not necessary if the shaft and the bore of the sleeve are made with sufficient precision.

A detent wheel 330 (Fig. 7) is preferably mounted on the shaft 116 and engaged by a spring pressed detent 331. This detent device may be of the same construction as that ordinarily mounted on the platen axle. The bracket 332 to which the detent 331 is pivoted, is mounted on the carriage.

*Résumé of operations*

The operation of the mechanism may be understood from a description of it in the particular instance, based on the form shown in Fig. 4, viz., a form of a length equal to 51 single line spaces, with a heading beginning at line 6 and an item field beginning at line 14, and provision for a maximum of 14 item lines on a form.

When beginning a run, a tabulating machine is usually put through a preliminary total taking operation. This brings the parts to the position shown in Fig. 11 and nearly to that shown in Fig. 6; that is to say, to the position they should occupy when the first heading line of a form (line 6, Fig. 4) is in printing position. If the machine be then given a single cycle and stopped, the first card will be sensed. A web of paper may then be inserted, with the first heading line at the printing line, and the machine may be started. The machine will then print from the heading cards until it senses the last one, containing the control hole. During this time, the follower 302 (Fig. 6) is on the cam 300, holding arm 292 in the position shown where its lower shoulder 294 arrests the line space shaft 82 to limit line spacing to a single space. The control hole causes rod 206 (Fig. 10) to be elevated, tripping the drive pawl 182 for disk 176, to cause a feed of the paper to the first item line (line 14 of Fig. 4). The rod 206 rocks trip lever 192 which releases latch 185 and also raises link 153 to position to trip the clutch. At about the middle of the cycle in which the last heading line is printed, link 153 operates to trip the clutch, causing the feed to line 14 to be effected before the printing of the first item on the next cycle. This feed moves cam 300 (Fig. 6) from under follower 302, allowing arm 192 to swing up out of the way of stud 291, permitting double spacing of items.

If there are less than 14 items, then when a total is taken, the machine executes a blank stroke, in the latter part of which the total pull causes the link 98 (Fig. 3) to move upward, which, through lever 284, rocks the total shaft 199, which (Fig. 13) rocks the trip lever 192 associated with the line finding disk 175, tripping the associate drive pawl 182 and raising the link 153 to operative position. The total is printed toward the middle of the total cycle, and soon afterward, the cam 162 (Fig. 14) rocks shaft 157, which (Figs. 12 and 13) trips the clutch and starts the feed of the paper to line 6 of the next form.

If there are more than 14 items, then (Fig. 10) when, just after printing the 14th item, the paper steps to the 15th line, the cam 212, acting on follower 213, rocks the capacity trip lever 192C, with the same general effect as before, setting the mechanism for a feed to line 14 of the next form, such feed to begin at 195° of the next cycle. However, for the reasons given hereinbefore, the 15th item is not printed on that cycle, but the machine is set for a blank cycle. When the trip lever 192C is operated, its depending arm, acting through link 222, rocks the capacity shaft 223 which (Figs. 1, 16, 17, and 18), pulls the hook 234 into engagement witht he pin 233 on arm 232, and pulls the hook 236 into spring urged contact with bar 137. At around 300° of the cycle, shaft 231 rocks, and pin 233 and hook 234 pull link 230 upward, where it is retained by hook 236 snapping over bar 137. Link 230, through lever 237, pushed down on link 240, rocking the slam bail follower levers 242 and 241 of the total control unit, and the lever 241, through the usual linkage, pulls the slam bail shaft 248 and designation shaft 251, locking the type bars against rising in the 15th cycle. Also, the link 240, acting on pin 280, depresses link 262, locking the card stop 272 at 276, thus retaining the 15th card in the sensing chamber. The link 262 also, through lever 263 and link 264, rocks hook 267 into locking engagement with the link 268 of the picker mechanism, stopping the picker. Thus the 15th cycle includes no card feed and no printing, but, at 195° the paper is fed to line 14, the first item line of the next form, where, on the 16th cycle, the 15th item will be printed, because, during the paper feed, the cam 212 (Fig. 10) runs off of the follower 213, allowing trip lever 192C and shaft 223 to return to normal position. The return of said shaft releases hooks 234 and 236 from the link 230 and the bar 137, respectively, so that the 16th cycle is a tabulating cycle.

If the number of items happens to be just 14, then the capacity feed and the blank stroke mechanism will be automatically defeated and the total will be printed on the 15th line of the first form. The operation during the 14th cycle will be as above described; that is to say, the trip lever 192C will be operated, and the link 230 raised to set the mechanism for a blank cycle and a capacity feed; but at about 350° the change of designation is detected, setting the total control unit into action. Early in the 15th cycle, the credit balance cam on shaft 219 of the total control (Fig. 23) rocks its follower lever, which, through lever 282 and link 283, rocks shaft 220, the arm 221 on which (Fig. 10) swings pawl 215 out of engagement with stud 216, allowing trip pawl 192C to return to normal and moving hooks 234 and 236 to inactive positions. This defeats the capacity feed; but the total control mechanism itself rocks the slam bail and designation shafts and locks the card stop and the picket, making this the regular blank stroke of total taking. The rocking of shaft 220 also (Fig. 6), through arm 297 and link 295, rocks the stop plate 292 to its full extent bringing its highest shoulder 294 into the path of stud 291 on line space shaft 80, preventing the usual line space on the blank cycle, leaving the paper at line 15 where the total is printed on the total cycle. At about, say, 300° of the blank cycle, the total pull occurs, causing the paper to be fed to the first heading line (line 6) of the next form, as above described.

It has been explained hereinbefore that the mechanism may be used to print only one line on a form, as in writing checks. There may also be instances where several lines are to be printed, but no totals are to be taken. If, for example, each form has a length of three and one half inches (21 single line spaces) and the single line, or the first of several lines, is to be printed on line 12, the operation would be as follows: Each single card, or the last card of each group, would be punched with the control hole to cause an operation of the plunger 206 (Fig. 10) to cause a feed by the line finding disk 176. When a web of paper is put into place in the machine, an otherwise blank card containing such a hole, is first sensed and the machine is stopped. This brings the notch in disk 176 to its stop position. The operator then adjusts the first form so that its line 12 is in printing position, and then sets the machine into regular operation. If there is only one card for each form, that card will be punched to print the desired matter and also with the control hole, so that the paper is advanced to the next form after each printing. If there are several cards, the paper will be line spaced until the control hole is sensed, whereupon it will be advanced to line 12 of the next form.

It will of course be understood that the operations above described in detail, are illustrative only, relating to a particular form and to the particular machine to which the invention is shown applied. The disk 111, the means to impart a single rotation to said disk, the line finding disks 175, etc., and the individual drive pawls 182, and their latches 183 and the means 192 to trip said latches selectively, the disks connected by gearing to the paper feeding device (the cylinder or platen, in the present instance), constitute a combination adapted to a variety of conditions, and the trip levers may be operated at various times and by various means, each according to individual requirements. As shown, the trippers are operated by the paper feed at the bottom of the form, by the total pull, and by the action of a control hole in a card, because these things yield the desired operations. If, for example, it was desired to impart a long feed following a grand total, a tripper could be connected to some part of the machine that moves in the latter part of the total cycle, instead of to the total linkage.

It will be noted that the tripping of the clutch occurs at about 180° of a cycle. All of the tripping means for the line finding pawls 182 as herein described in detail, operate later in the cycle than that, with the result that the long feed begins after printing in the next succeeding cycle; but if a tripper was operated prior to 180°, the feed would begin after printing in the same cycle. If, therefore, a tripper was connected to some part that moves early in the blank cycle, the feed would begin at 195° of that cycle and be completed before the printing of the total. These are cited as a few instances to illustrate the versatility of this combination.

It will be apparent from the foregoing that the invention, as to some of its features, may be embodied in forms differing considerably from the specific one described; that changes in the details of construction and arrangement may be made without departing from the invention; and that some of the features of the invention may be used without others.

What we claim as new, and desire to secure by Letters Patent, is:

1. In the long paper feed mechanism of a machine of the class described, the combination of a paper-feeding cylinder, line finding disks geared to said cylinder and each having a tooth, a one-revolution drive disk co-axial with said toothed line finding disks, tooth engaging drive pawls pivoted to said drive disk and spring urged each into engagement with its respective line finding disk, an individual latch for each of said pawls, means to trip said latches selectively, and power means to impart a single rotation to said drive disk.

2. In the long paper feed mechanism of a machine of the class described, the combination of a paper-feeding cylinder, line finding disks geared to said cylinder and each having a tooth, a one-revolution drive disk co-axial with said toothed line finding disks, tooth-engaging drive pawls pivoted to said drive disk and spring urged each into engagement with its respective line finding disk, an individual latch for each of said pawls, means to trip said latches selectively, power means to impart a single rotation to said drive disk, and means to restore said pawl or pawls to latched-out position after said drive disk has come to rest.

3. In the long paper feed mechanism of a machine of the class described, the combination of a paper-feeding cylinder, line finding disks geared to said cylinder and each having a tooth, a one-revolution drive disk co-axial with said toothed line finding disks, tooth engaging drive pawls pivoted to said drive disk and spring urged each into engagement with its respective line finding disk, an individual latch for each of said pawls, a rotating power shaft, a one revolution clutch between said power shaft and said drive disk, and means to trip said latches selectively and concomitantly to condition said clutch for operation.

4. In the long paper feed mechanism of an accounting machine, the combination of a paper feeding cylinder, line-finding disks each having a tooth, a gear attached to and driven by said line-finding disks, tooth engaging drive pawls one for each of said line finding disks, spring urged each into engagement with its respective line finding disk, individual latches to hold said pawls out of such engagement, means to trip said latches selectively, a drive disk on which said pawls and latches are mounted, power means to impart a single rotation to said drive disk, and a second gear driven by the first recited gear and itself geared to said paper feed cylinder, the said line finding disks and the first recited gear being comprised in a removable unit adapted to afford a particular style of paper feeding and interchangeable with another unit adapted to another style of paper feeding.

5. In the paper feed mechanism of a machine of the class described, the combination with a paper feed cylinder, of a line disk geared to said cylinder and having a tooth, a tooth engaging feed pawl spring urged to engage said disk, a latch normally restraining said pawl, an overthrow preventing pawl to engage said disk, a one revolution clutch to drive said feed pawl, and means to release said pawls from said disk after said clutch has completed its revolution.

6. In a machine of the class described for printing on a web of paper divided into forms, the combination with printing mechanism, paper feeding mechanism including means to effect a capacity feed from a predetermined line position of the paper, a line spacing device, total taking control mechanism, means operated by the total taking control mechanism to interrupt the operation of said printing mechanism for a blank cycle preceding a total taking cycle, of a control set by said paper feeding mechanism and acting when the paper passes said predetermined line position to preset said feeding mechanism for a capacity feed in the next succeeding cycle of the machine, means whereby said control causes an operation of said interrupting means independently of said total taking control mechanism to cause said next cycle to be a blank cycle so as to delay the printing of the next item until the capacity feed shall have occurred, and means actuated by said total taking control mechanism, in the event that the latter comes into operation at the time, to cancel the setting of said capacity feed control so as to cause the total to be printed without a preceding capacity feed.

JOHN MUELLER.
JOSEPH MARTIN McDONNELL.

REFERENCES CITED

The following references are of record in the file of this patent:

UNITED STATES PATENTS

| Number | Name | Date |
| --- | --- | --- |
| 1,976,617 | Lake et al. | Oct. 9, 1934 |
| 2,022,823 | Racz | Dec. 3, 1935 |
| 2,059,215 | Dreher | Nov. 3, 1936 |
| 2,138,646 | Scharr | Nov. 29, 1938 |
| 2,156,990 | Keen | May 2, 1939 |
| 2,170,696 | Rhodes | Aug. 22, 1939 |
| 2,189,025 | Carroll et al. | Feb. 6, 1940 |
| 2,234,262 | Lake | Mar. 11, 1941 |
| 2,297,743 | Carroll et al. | Oct. 6, 1942 |
| 2,310,418 | Ghertzmann | Feb. 9, 1943 |
| 2,323,816 | Lasker et al. | July 6, 1943 |
| 2,354,082 | Wyrick | July 18, 1944 |
| 2,369,441 | Daly et al. | Feb. 13, 1945 |